3,349,050
COATING COMPOSITION
Alexander N. Salem, Brecksville, Ohio, assignor, by mesne assignments, to Mobil Oil Corporation, a corporation of New York
No Drawing. Filed Apr. 8, 1965, Ser. No. 446,700
8 Claims. (Cl. 260—22)

The present invention relates to air-dry organic solvent solution coating compositions comprising a compatible blend of a styrene and/or methyl methacrylate modified alkyd resin and a methyl methacrylate copolymer containing as further essential components, lauryl methacrylate and monoethylenically unsaturated carboxylic acid. These coating compositions, useful for metal finishing, especially in automotive refinishes, are characterized by improved gloss retention on exposure to weather, improved durability, improved non-lift on recoat and improved solvent resistance, especially resistance to gasoline. These compositions are also distinguished by their capacity to dry rapidly.

In the past, styrene modified alkyds, methyl methacrylate modified alkyds and styrene-methyl methacrylate modified alkyds have been used as touch-up enamels and automotive refinishes. These finishes have proved to be inadequate in numerous respects. Thus, gloss retention has been less than desired, recoating tends to lift the original coating, and solvent resistance, especially to gasoline, is poor.

In an attempt to overcome these difficulties, workers have varied the proportions of styrene and methyl methacrylate. Unfortunately, when the amount of styrene in the alkyd is increased for better recoat adhesion, the high amount of styrene needed for this purpose tends to cause chalking on exposure. When increased amounts of methyl methacrylate are added to the alkyd to improve gloss and gloss retention, the high proportion of methyl methacrylate in the alkyd produces a coating which checks or microfractures with ageing.

In accordance with the present invention, these difficulties are overcome by forming organic solvent solution coating compositions comprising compatible blends of styrene and/or methyl methacrylate modified alkyd resins and methyl methacrylate copolymers consisting essentially of methyl methacrylate, lauryl methacrylate and monoethylenically unsaturated carboxylic acid. This blend allows the inclusion of higher proportions of styrene and methyl methacrylate within the coating system, without causing chalking upon exposure to weather or checking with ageing, while providing a coating system characterized by good gloss retention, durability, non-lift on recoat and improved solvent resistance. Ethylenic monomers other than styrene or methyl methacrylate in amounts up to about 10% of total ethylenic monomer may be present in the copolymer alkyd without undue detriment.

The alkyd resin used in accordance with the invention may be modified with styrene or methyl methacrylate, but, preferably it is modified with both. These modified alkyd resins are well known to the art and are produced by standard methods. As illustrative of a typical basic alkyd system which may be modified is a system comprising linseed oil, glycerine, pentaerythritol and phthalic anhydride. The invention is not limited to this specific system but may include other known and conventional modifiable alkyd systems and mixtures thereof.

The modified alkyd system preferably contains approximately 30–50% by weight of modifying agent and correspondingly from 50–70% by weight of basic alkyd materials.

To further illustrate the wide range of alkyd resins which may be used for copolymerization in accordance with the invention, these alkyds being sometimes referred to as unsautrated polyester resins, reference is made to Nyquist and Kropa U.S. Patent 2,503,209; Thomas U.S. Patent 2,689,228; and Sekmakas U.S. Patent 3,163,615.

While styrene or methyl methacrylate modified alkyd resins may be used, the alkyd modifiers are preferably both styrene and methyl methacrylate which are used in a weight ratio of from 6:1 to 1:3. The presence of both monomers in the alkyd is important in the combination since it complexes the system and leads to better gloss retention and better recoat adhesion. Preferably, the weight ratio of styrene to methyl methacrylate is approximately 3:1.

The modified alkyd resin is usually utilized in an organic solvent solution, the solids content of which may be varied to suit individual needs. Typical organic solvents which may be used are discussed hereinafter.

The modified alkyd resin is blended in compatible admixture with a copolymer of methyl methacrylate, lauryl methacrylate and monoethylenically unsaturated carboxylic acid, the lauryl methacrylate being essential to provide compatibility with the modified alkyd resin in the blend.

The copolymer comprises, as its major component, methyl methacrylate which constitutes 50 to 75% by weight of the copolymer. Preferably, the methyl methacrylate constitutes 60 to 70% by weight of the copolymer.

The lauryl methacrylate which provides the compatibility between the copolymer and the modified alkyd resin constitutes 15 to 40% by weight of the copolymer and preferably about 30%.

The copolymer also includes 1–10% by weight of a monoethylenically unsaturated carboxylic acid. This acid is preferably acrylic acid but other monoethylenically unsaturated carboxylic acids can be used such as methacrylic acid, maleic acid, fumaric acid, crotonic acid, monosubstituted maleic acid, monosubstituted fumaric acid and mixtures thereof. Preferably the acid constitutes 2–6% by weight of the copolymer.

The copolymer may also include up to 10% by weight of other monoethylenically unsaturated copolymerizable materials though these materials are preferably absent. Illustrative of these materials are ethyl acrylate, 2-ethyl hexyl acrylate, etc.

The copolymers which are employed in the invention are produced by addition copolymerization in organic solvent solution denoting the fact that polymerization takes place in solution to produce a polymer which is soluble in the organic medium in which polymerization is conducted. It is usually preferable to employ the same solvents in the final coating as are employed in the copolymerization. Aromatic hydrocarbon solvents such as xylene and toluene and homologs thereof are particularly convenient as well as mixtures thereof with alcohols such as butanol or 2-ethoxy ethanol or 2-butoxy ethanol. Other solvents which may be employed are illustrated by butyl acetate, methyl ethyl ketone and the like.

The modified alkyd resin and the copolymer are blended to form the coating compositions of the present invention, the alkyd resin being the major component of the blend. The blend comprises 50–90% by weight of the modified alkyd resin and 10–50% by weight of the copolymer. Preferably, the modified alkyd resin comprises approximately 70–80% of the blend, the remainder being the copolymer.

The compatible blends of the present invention provide the basis of coating compositions which can be cured in air to provide coatings characterized by improved gloss retention, good durability, improved non-lift on recoat and improved solvent resistance. Also, the blends of the invention improve dry time as compared with the copolymer alkyd itself. If desired, these coatings may also be cured under elevated temperature.

It is to be understood that the blends of the present invention may be modified with pigments, dyes and fillers as desired to provide coating compositions of varying utility and this is within the scope of the invention.

The invention is illustrated in the examples which follow in which all percents are by weight.

EXAMPLE I

*Preparation of styrene-methyl methacrylate modified alkyd resin*

An in situ styrene-methyl methacrylate modified alkyd resin is prepared using a standard technique from the following materials.

|  | Weight Percent | Percent Solids |
|---|---|---|
| Linseed Oil | 13.44 | 13.44 |
| Glycerine | 3.92 | 3.92 |
| Phthalic Anhydride | 9.48 | 9.48 |
| Pentaerythritol | .83 | .83 |
| Styrene | 18.52 | 18.52 |
| Methyl Methacrylate | 4.63 | 4.63 |
| Lithium Ricinolate (50% water solution) | .10 |  |
| Di-tertiary-Butyl Peroxide | .74 |  |
| Xylol | 48.04 |  |
| Dimethyl Ethanolamine | .30 |  |
|  | 100.00 | 50.82 |

EXAMPLE II

*Preparation of methyl methacrylate copolymer*

A copolymer of methyl methacrylate, lauryl methacrylate and glacial acrylic acid is prepared using conventional addition polymerization techniques from the following materials.

|  | Total Weight Percent | Percent Solids | Percent |
|---|---|---|---|
| Methyl Methacrylate | 33.67 | 33.67 | 68.0 |
| Lauryl Methacrylate | 14.85 | 14.85 | 30.0 |
| Glacial Acrylic Acid | .99 | .99 | 2.0 |
| Benzoyl Peroxide | .99 |  |  |
| Methyl Ethyl Ketone | 24.75 |  |  |
| Toluol | 24.75 |  |  |
|  | 100.00 | 49.51 | 100.0 |

EXAMPLE III

The following example illustrates an enamel prepared in accordance with the present invention comprising a blend of 79% of the styrene-methyl methacrylate modified alkyd resin of Example I and 21% of the copolymer of Example II.

The enamel is prepared by blending 50.76% by weight, based on the total weight of the enamel (25.80% solids) of the modified alkyd resin of Example I with 13.30% by weight (6.58% solids) of the copolymer of Example II and 35.94% by weight of pigments, driers, solvents, etc., as follows:

| | Percent by weight |
|---|---|
| Antiskinning agent | 0.10 |
| Titanium dioxide | 18.40 |
| Xylol | 13.94 |
| Bentone clay | .20 |
| Isopropyl alcohol | .80 |
| Dimethylethanol amine | .20 |
| Silicone (2% solution in xylol) | .20 |
| Zircon naphthenate | 1.50 |
| Cobalt naphthenate | .20 |
| Manganese naphthenate | .40 |

This enamel was coated onto a primered metal base and air dried. The coating exhibits good gloss retention upon exposure, good non-lifting characteristics upon recoat and good gasoline resistance.

EXAMPLE IV

*Preparation of a methyl methacrylate copolymer*

A copolymer of methyl methacrylate, lauryl methacrylate and glacial acrylic acid is prepared using standard addition polymerization techniques from the following materials.

|  | Total Weight Percent | Percent Solids | Percent |
|---|---|---|---|
| Methyl Methacrylate | 32.7 | 32.7 | 65.8 |
| Lauryl Methacrylate | 14.9 | 14.9 | 30.0 |
| Glacial Acrylic Acid | 2.1 | 2.1 | 4.2 |
| Benzoyl Peroxide | 0.7 |  |  |
| Methyl Ethyl Ketone | 24.8 |  |  |
| Toluol | 24.8 |  |  |
|  | 100.00 | 49.7 |  |

EXAMPLE V

A clear coating composition is prepared by blending 70% of a methyl methacrylate modified alkyd resin (the in situ production of modified alkyd resin as reported in Example I is repeated using 23.15 parts of methyl methacrylate in place of the styrene and methyl methacrylate used in said example) with 30% of the copolymer of Example IV. The coating composition is coated on a primed metal substrate and air dried. The coating exhibits good gloss and good gasoline resistance.

EXAMPLE VI

A coating composition is prepared by blending 70% of a styrene modified alkyd resin (the in situ production of modified alkyd resin as reported in Example I is repeated using 23.15 parts of styrene in place of the styrene and methyl methacrylate used in said example) with 30% of the copolymer of Example IV. Upon cure, the coating exhibits properties similar to the product of Example V.

Drying properties are facilitated by the incorporation of conventional drier compounds in the coating compositions. As is well known, cobalt, zirconium and the like naphthenates and octoates are effective driers and these can be incorporated in amounts of from 0.25 to 5% by weight, based on the weight of the coating composition. On the other hand, it is not essential to rely upon drying at room temperature and elevated temperatures can be employed, e.g., by the utilization of infrared heat lamps to speed the drying. When moderately elevated temperatures are contemplated, the proportion of drier which is appropriate would be reduced.

The invention is defined in the claims which follow.

I claim:

1. In organic solvent solution, a compatible blend of:
   (1) organic solvent-soluble copolymer of an ethylenically unsaturated, oil-modified alkyd resin with monomers selected from the group consisting of styrene, methyl methacrylate, and mixtures of styrene and methyl methacrylate, said copolymer containing at least 30% by weight of said monomers; and
   (2) organic solvent-soluble methyl methacrylate copolymer consisting essentially of from 50–75% by weight of methyl methacrylate, from 15–40% by weight of lauryl methacrylate and from 1 to 10% by weight of monoethylenically unsaturated carboxylic acid;

said blend containing said copolymer alkyd and said methyl methacrylate copolymer in a weight ratio of 50:50 to 90:10.

2. A solution as recited in claim 1 in which said copolymer alkyd contains copolymerized styrene and methyl methacrylate in a weight ratio range of from 6:1 to 1:3.

3. A solution as recited in claim 1 in which said monoethylenically unsaturated carboxylic acid is acrylic acid.

4. An air-dry organic solvent solution coating composition comprising;
(A) a compatible blend of:
(1) organic solvent-soluble copolymer of 50–70 parts by weight of ethylenically unsaturated, oil-modified alkyd resin with 30–50 parts by weight of a mixture of monomers consisting essentially of styrene and methyl methacrylate in a weight ratio of from 6:1 to 1:3; and
(2) organic solvent-soluble methyl methacrylate copolymer consisting essentially of from 50–75% by weight of methyl methacrylate, from 15–40% by weight of lauryl methacrylate and from 1 to 10% by weight of monoethylenically unsaturated carboxylic acid;
said blend containing said copolymer alkyd and said methyl methacrylate copolymer in a weight ratio of 50:50 to 90:10, and
(B) 0.25% to 5% by weight of the coating composition of drier compound.

5. An air-dry solvent solution coating composition as recited in claim 4 in which the weight ratio of styrene to methyl methacrylate in said copolymer alkyd is approximately 3 to 1.

6. An air-dry solvent solution coating composition as recited in claim 4 in which said copolymer consists essentially of 60–70% by weight of methyl methacrylate, 24–38% by weight of lauryl methacrylate and 2–6% by weight of monoethylenically unsaturated monocarboxylic acid.

7. An article having a metal surface having adhered thereto a dried coating of the composition of claim 1.

8. An article having a metal surface having adhered thereto an air dried coating of the composition of claim 4.

References Cited

UNITED STATES PATENTS

| | | | |
|---|---|---|---|
| 2,890,185 | 6/1959 | Sample et al. | 260—22 |
| 2,986,543 | 5/1961 | Daniel | 260—22 |
| 3,088,926 | 5/1963 | Morris et al. | 260—22 |
| 3,198,759 | 8/1965 | Schmidle | 260—22 |

FOREIGN PATENTS 236,675  12/1961  Australia.

SAMUEL H. BLECH, *Primary Examiner.*

MURRAY TILLMAN, *Examiner.*

J. T. GOOLKASIAN, *Assistant Examiner.*